United States Patent [19]
Kusz

[11] Patent Number: 5,997,684
[45] Date of Patent: Dec. 7, 1999

[54] METHOD AND APPARATUS FOR ASSEMBLING A SEALING LINER TO A PLASTIC CLOSURE

[75] Inventor: Maximillian Kusz, Waterville, Ohio

[73] Assignee: Owens-Illinois Closure Inc., Toledo, Ohio

[21] Appl. No.: 08/962,173

[22] Filed: Oct. 31, 1997

[51] Int. Cl.⁶ .................................................. B32B 31/20
[52] U.S. Cl. .................... 156/290; 156/308.4; 156/583.1
[58] Field of Search .......................... 156/69, 290, 308.4, 156/580, 581, 583.1, 292

[56] References Cited

U.S. PATENT DOCUMENTS

| | | | |
|---|---|---|---|
| 2,039,757 | 5/1936 | Von Till | 215/350 |
| 2,646,183 | 7/1953 | Pellett | 215/40 |
| 2,904,837 | 9/1959 | Crabbe | 215/350 |
| 3,330,720 | 7/1967 | Stevens et al. | 161/162 |
| 3,637,103 | 1/1972 | Ptak | 215/40 |
| 3,767,076 | 10/1973 | Kennedy | 215/40 |
| 4,381,840 | 5/1983 | Ostrowsky | 215/329 |
| 5,164,208 | 11/1992 | Thomas | 425/396 |
| 5,468,315 | 11/1995 | Okada et al. | 156/64 |
| 5,562,797 | 10/1996 | Phelps | 156/510 |

*Primary Examiner*—James Sells

[57] ABSTRACT

A method of constructing a lined closure in which a liner having a circular base, a liner membrane and a thermoplastic adhesive securing the liner membrane to the base, is press fitted into a closure having a skirt with internal threads such that the liner engages and rides over the threads and is positioned against the internal base of the closure. Heat is applied to the liner at least around the periphery of the liner so as to melt the thermoplastic adhesive and resecure the liner membrane to the liner base. In this way, the liner membrane is resecured to the liner base so as to correct any separation between the membrane and base that might have occurred as the liner was press fitted into the closure.

25 Claims, 2 Drawing Sheets

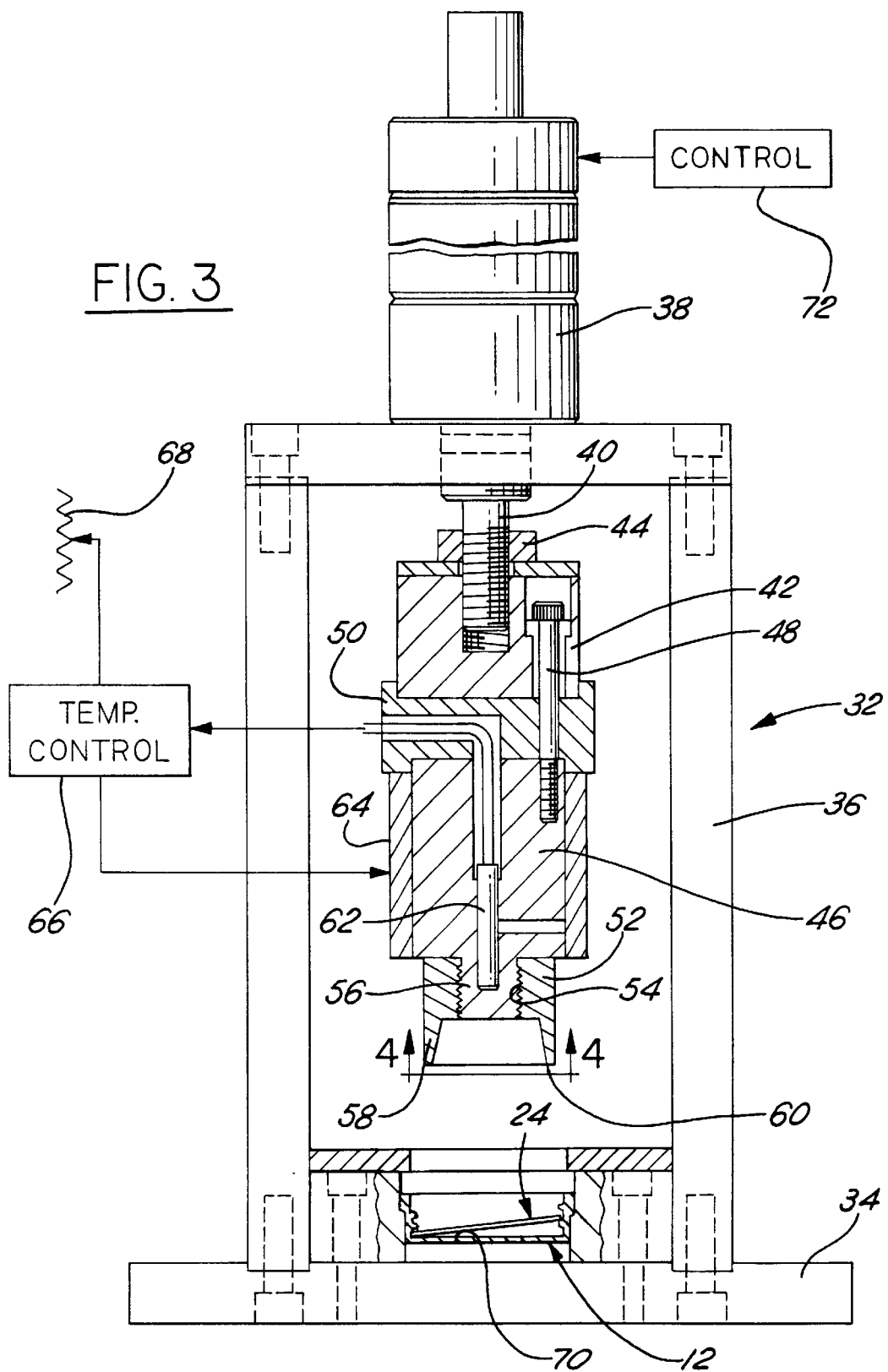

METHOD AND APPARATUS FOR ASSEMBLING A SEALING LINER TO A PLASTIC CLOSURE

The present invention relates to plastic closures having a liner at the base of the closure for sealing engagement with the finish of a container, and more particularly to a method and apparatus for assembling the liner to the closure.

BACKGROUND AND OBJECTS OF THE INVENTION

Plastic closures for containers typically comprise a circular base having an integral peripheral skirt with internal threads for engaging external threads on the container finish. A liner is assembled to the closure at the closure base for sealing engagement with the annular top surface of the container surrounding the container mouth. The liner may be adhesively secured to the base of the closure, or may be press fitted into the closure and retained against the closure base by a bead or other suitable means on the inside diameter of the skirt adjacent to the base. For some products such as vitamins or instant coffee, a glassine liner seal is incorporated as part of the liner. This glassine inner seal may be used as a tamper-evident feature. The liner preferably has a base of vinyl-impregnated laminated pulp construction, a liner membrane of glassine paper construction, and a thermoplastic adhesive such as wax or butyl rubber securing the liner membrane to the base. These liners are typically made in long strips and then die cut to the appropriate diameter for assembly to the closure. In applications in which the liner is press fitted into the closure over the closure internal threads and/or liner-retaining bead, the periphery of the liner membrane can become separated from the liner base. This separation can be exacerbated to the point that the liner membrane curls and peals from the base, particularly when the lined closure is subjected to humidity cycles (such as during shipment) before the closure is applied to a container. Such curling and pealing is unsightly, and can ultimately result in the glassine membrane falling out of the closure.

It is therefore a general object of the present invention to provide a method and apparatus for assembling a liner to a closure in which the liner membrane is resecured to the liner base during or after the assembly operation to ensure proper sealing with the container finish during use. Another object of the present invention is to provide a method and apparatus of the described character that can be readily implemented in an otherwise conventional assembly operation with minimum additional tooling investment, and with little or no reduction in assembly productivity.

SUMMARY OF THE INVENTION

In accordance with one aspect of the present invention, there is provided a method of constructing a lined closure that comprises the step of pressing a liner having a circular base, a liner membrane and a thermoplastic adhesive securing the liner membrane to the base, into a closure having a skirt with internal threads such that the liner engages and rides over the threads and is positioned against the internal base of the closure. Heat is applied to the liner at or near the periphery of the liner so as to melt the thermoplastic adhesive and resecure the liner membrane to the liner base. In this way, the liner membrane is resecured to the liner base so as to correct any separation between the membrane and base that might have occurred as the liner was press fitted into the closure. The steps of pressing the liner into the closure and applying heat to the liner so as to remelt the thermoplastic adhesive may be carried out either simultaneously or sequentially in accordance with the invention. The base of the liner is preferably of pulp composition, the membrane preferably is of glassine composition, and the thermoplastic adhesive preferably comprises wax. The membrane and liner base may be of the same outer diameter, or the membrane may be of slightly larger diameter than the liner base.

Apparatus for assembling a sealing liner to a plastic closure in accordance with another aspect of the present invention includes means for holding a closure in position with a sealing liner disposed therein adjacent to the base of the closure, a tip for movement into the closure for engaging the liner at least around the periphery of the liner, and a heater for heating the tip so as to apply heat to the liner at least around the periphery thereof as the liner is held against the base of the closure. In the preferred implementation of this aspect of the invention, the apparatus is constructed and arranged for press fitting the liner into the closure and applying heat to the liner so as to resecure the liner membrane to the liner base. The invention may thus be implemented in an existing so-called after-pounder for press fitting the liner into the closure by providing means for heating the after-pounder tip during the assembly operation. In this way, there is minimal additional investment in capital and no loss of assembly productivity.

The after-pounder tip in the preferred embodiment of the invention has an annular end for engaging the liner with a footprint that substantially matches the footprint or area of sealing engagement with the annular sealing surface of the container. That is, the outside diameter of the after-pounder tip is preferably equal to the "E" dimension of the container finish, and the inside diameter of the after-pounder tip is preferably equal to the "I" dimension of the container finish. The thermoplastic wax liner adhesive has a melting temperature of about 150° F. In one presently preferred implementation of the invention, the after-pounder tip is heated to 400° F., and maintained in contact with the liner for about 200 milliseconds at 40 psi pressure.

BRIEF DESCRIPTION OF THE DRAWINGS

The invention, together with additional object, features and advantages thereof, will be best understood from the following description, the appended claims and the accompanying drawings in which:

FIG. 3 is a partially sectioned elevational view of apparatus for assembling a sealing liner to a plastic closure in accordance with a presently preferred embodiment of the invention;

DETAILED DESCRIPTION OF PREFERRED EMBODIMENTS

Figure 1:
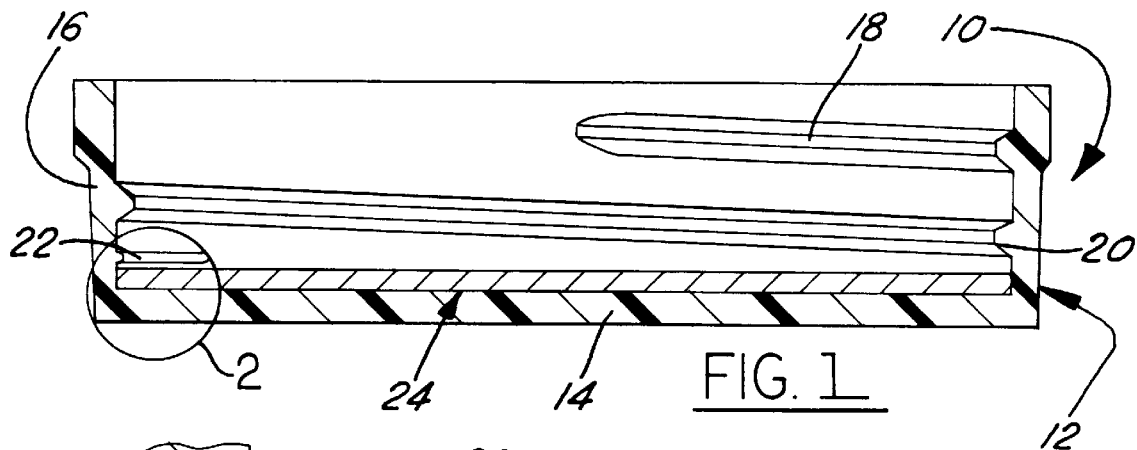
FIG. 1 is a sectioned elevational view of a closure with sealing liner in connection with which the present invention preferably is implemented.
Figure 2:
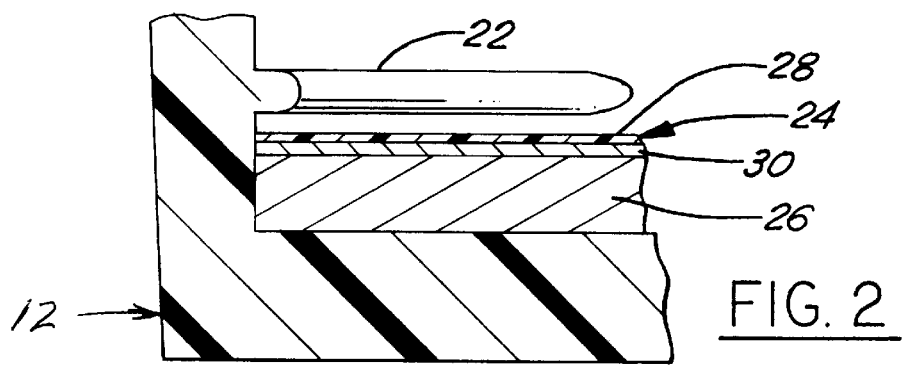
FIG. 2 is a fragmentary view on an enlarged scale of the portion of FIG. 1 within the circle 2.

FIGS. 1 and 2 illustrate a closure assembly 10 as comprising a plastic closure or cap 12 having a circular base 14 and an integral peripheral skirt 16. Helical internal threads 18 are integrally formed on the inside diameter of skirt 16, having one end 20 disposed adjacent to but spaced from closure base 14. A bead 22 is diametrically opposed to thread end 20 and extends part way around the inner diameter of skirt 16 at a position adjacent to but spaced from circular base 14 of closure 12. A liner 24 is disposed within skirt 16 at base 14, being captured in position by bead 22 and end 20 of threads 18. Liner 24 comprises a base 26 that is preferably of layered vinyl-impregnated pulp composition. A circular liner membrane, preferably of layered glassine composition, is secured to base 26 by a thermoplastic adhesive layer 30. Layer 30 is preferably of wax composition.

Liner 24 preferably is die cut from preformed sheets, with membrane 28 being secured to base 26 by adhesive layer 30. Membrane 28 may be either of the same diameter as base 26, or may be of slightly larger diameter. A liner 24 is then placed over the open end of a preformed closure 12 with the outer periphery of liner 24 resting on the upper edges of threads 18 (see FIG. 3). The liner is then press fitted over threads 18 and bead 22 against base 14 of closure 12. During this press-fit operation, the peripheral edges of liner base 26 and membrane 28 ride over the closure threads and bead, which can cause the liner membrane to become separated from the base. As noted above, such separation can result in blistering beneath the liner membrane and pealing of the membrane from the base, particularly when the closure assembly is subjected to humidity cycles such as during shipment to a bottling plant.

Figure 4:
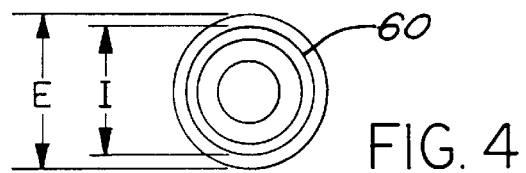
FIG. 4 is a sectional view taken substantially along the line 4—4 in FIG. 3.
Figure 5:
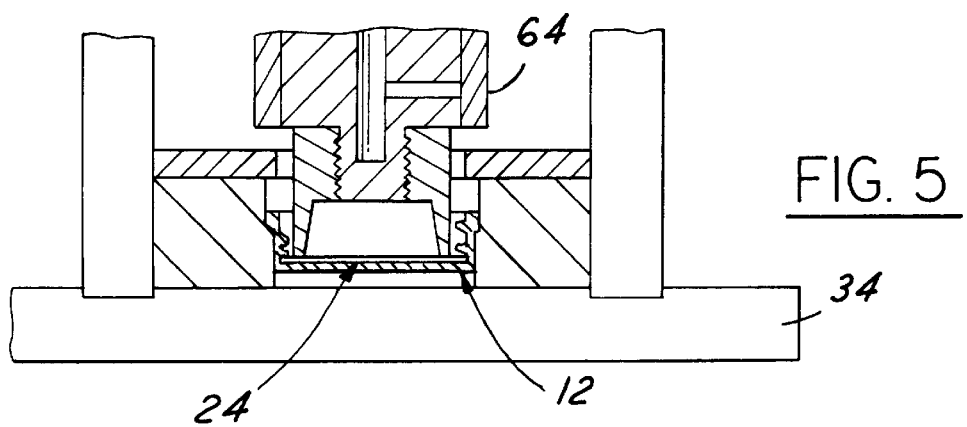
FIG. 5 is a fragmentary sectional view of a portion of FIG. 3 with the heated tip closed against a sealing liner press fitted into a closure.

FIGS. 3–5 illustrate an apparatus 32 in accordance with a presently preferred embodiment of the invention for press fitting a liner 24 into a closure 12, and for simultaneously resecuring the periphery of the liner membrane to the liner base against any separation that may occur during this press-fitting operation. Apparatus 32 comprises a base 34 over which a frame 36 supports a fluid cylinder 38. The rod 40 of cylinder 38 is threaded into an attachment shank 42 and secured thereto by a jam nut 44. A body 46 of heat-conductive construction such as metal is secured to shank 42 by means of a circular array of screws 48, with a heat-insulating spacer 50 being disposed between shank 42 and body 46. A tip 52 has an internal bore 54 that is threaded onto the reduced end 56 of body 46, and has an integral collar 58 that extends therefrom to form a flat annular end surface 60 for engagement with a sealing liner. Annular end surface 60 has an internal diameter (FIG. 4) substantially equal to the "I" dimension (internal diameter) of the container in connection with which the cap is to be used, and an outer diameter equal to the "E" dimension (external diameter) of the container finish wall. The footprint of surface 60 is thus substantially the same as the footprint of the container sealing surface. Threaded mounting of tip 52 on body 46 permits a rapid change in tooling in the event that caps of a different diameter are to be run.

A thermocouple 62 is disposed within body 46 adjacent to end 56, and thus adjacent to tip 52 received thereon. An electric heater 64 externally encircles body 46, and is responsive to application of electrical energy from a temperature control circuit 66 for heating body 46 and tip 52. Temperature control circuit 66 receives a first signal from thermocouple 62 indicative of the temperature at body 46 and tip 52, and a second electrical signal from a variable resistor 68 or other suitable means for selective operator adjustment of a desired temperature at body 46 and tip 52. Thus, temperature control circuit 66 applies electrical energy to heater 64 as a function of a difference between the actual temperature at body 46 and tip 52 indicated by thermocouple 62, and the desired temperature indicated by variable resistor 68. A wax thermoplastic liner adhesive, currently preferred, has a melting temperature of about 150° F. In such an application, it is currently preferred to set the temperature of tip 52 at about 400° F. Base 34 has a pocket 70 for receiving closures 12 to which liners 24 are to be assembled.

In operation, with cylinder rod 40 retracted upwardly as illustrated in FIG. 3, a closure 12 is positioned within pocket 70, and a preassembled and precut liner 24 is positioned over closure 12 so as to rest upon the upper ends of the internal threads in the closure. Closures 12 and liners 24 are preferably presented in sequence by suitable automated assembly equipment. Body 46 and tip 52 are maintained at a desired elevated temperature (e.g., 400° F.) by means of temperature control circuit 66. At this point, fluid cylinder 38 is energized by means of a suitable control 72 so as to move rod 40, body 46 and tip 52 downwardly against liner 24 and press-fit liner 24 over threads 18 and bead 22 (FIGS. 1 and 2) against the base of closure 12. The elevated temperature of body 46 and tip 52 remelts the wax adhesive layer 30 (FIG. 2) in the annular region adjacent to the periphery of the liner so that, as tip 52 is withdrawn by cylinder 38, the wax layer resolidifies in this region so as to secure membrane 28 firmly against base 24. In the event that any separation had occurred between membrane layer 28 and base 26 during the press-fitting operation, such separation is removed and the membrane is resecured to the base. Control 72 may be adjusted to provide a desired pressure against liner 24, preferably 40 psi. Control 72 may also be set to permit tip 52 to remain in engagement with the liner for a brief dwell period, preferably 20 milliseconds. Spacer 50 prevents heat loss from body 46 to shank 42, which facilitates temperature control at tip 52 and also prevents heating of cylinder 38 and the cylinder control fluid.

The invention has been disclosed in connection with FIGS. 1–5 in a presently preferred implementation in which liner 24 is press-fitted into closure 12, and the liner thermoplastic adhesive layer is partially remelted to resecure the liner membrane to the liner base, in a single operation. Indeed, the structure illustrated in FIGS. 3–5 may replace the conventional "after-pounder" construction in an automated closure assembly line that merely press-fits the closure liners into the closure shells. Thus, there is minimum additional capital expense and little or no loss in assembly productivity. Alternatively, liners 24 may be pressed into closure shells 12 at one stage of operation, and the liner-and-closure assembly may then be subjected to a heating and remelt operation to resecure the liner membrane to the liner base in a subsequent stage of operation. It is also within the scope of the present invention, although not currently preferred, to provide an adhesive layer on the back side of the liner base for securing the liner to the base of the closure shell.

I claim:

1. A method of constructing a lined closure that comprises the steps of:

(a) providing a closure having a skirt with internal threads, (b) providing a liner that comprises a circular base, a liner membrane and a thermoplastic adhesive securing the liner membrane to the base, (c) pressing said liner into said closure by direct physical contact with the liner such that the periphery of said liner engages and rides over said threads, and (d) applying heat to said liner at or near the periphery of said liner by conduction through direct physical contact with the liner so as to melt said adhesive and secure said membrane to said base.

2. The method set forth in claim 1 wherein said steps (c) and (d) are carried out simultaneously.

3. The method set forth in claim 1 wherein said steps (c) and (d) are carried out sequentially.

4. The method set forth in claim 1 wherein said thermoplastic adhesive comprises wax.

5. The method set forth in claim 4 wherein said base of said liner is of pulp composition.

6. The method set forth in claim 5 wherein said membrane is of glassine composition.

7. The method set forth in claim 6 wherein said membrane and said base are of the same diameter.

8. The method set forth in claim 6 wherein said membrane has a larger diameter than said base.

9. The method set forth in claim 1 wherein heat is applied in said step (d) to an annular area of said liner at or near the periphery of said liner.

10. A method of assembling a liner to a closure, in which the liner comprises a circular base, a liner membrane and a thermoplastic adhesive securing said membrane to said base, and in which said closure comprises a peripheral skirt with internal threads, said method comprising the steps of:

(a) pressing said liner into said closure such that the periphery of said liner engages and rides over said threads, and (b) applying heat to said liner at or near the periphery of said liner by conduction through direct physical contact with said liner so as to melt said adhesive and secure said membrane to said base.

11. The method set forth in claim 10 wherein said steps (a) and (b) are carried out simultaneously by direct physical contact with the liner.

12. The method set forth in claim 11 wherein said membrane and said base are of the same diameter.

13. The method set forth in claim 10 wherein said steps (c) and (d) are carried out sequentially.

14. The method set forth in claim 13 wherein said membrane has a larger diameter than said base.

15. The method set forth in claim 10 wherein said thermoplastic adhesive comprises wax.

16. The method set forth in claim 15 wherein said base of said liner is of pulp composition.

17. The method set forth in claim 16 wherein said membrane is of glassine composition.

18. The method set forth in claim 10 wherein heat is applied in said step (b) to an annular area of said liner at or near the periphery of said liner.

19. Apparatus for assembling a sealing liner to a plastic closure, which comprises:

means for holding a closure in position with a sealing liner disposed therein adjacent a base of said closure, means for movement into a closure in said holding means for engaging the liner by direct physical contact at or near the periphery of said liner, and means for heating said engaging means so as to apply heat to said liner by conduction from the engaging means at or near the periphery thereof as said liner is held against the base of the closure.

20. The apparatus set forth in claim 19 wherein said engaging means comprises a body having an annular tip of a diameter less than the inside diameter of said closure for insertion into said closure against the liner.

21. The apparatus set forth in claim 20 wherein said heating means comprises an electric heater carried by said body and operatively coupled to said tip, and means for applying electrical energy to said heater to heat said body and said tip.

22. The apparatus set forth in claim 21 further comprising means for regulating electrical energy applied to said heater for maintaining a desired temperature at said tip.

23. The apparatus set forth in claim 22 wherein said regulating means comprises means carried by said body and operatively coupled to said tip for supplying a first electrical signal indicative of temperature at said tip means for supplying a second electrical signal as a function of said desired temperature at said tip, and means for controlling electrical energy applied to said heating means as a function of a difference between said first and second electrical signals.

24. The apparatus set forth in claim 23 wherein said tip has a flat annular end surface.

25. The apparatus set forth in claim 24 for assembling a liner to a closure for a container having a sealing surface with an inside diameter I and an outside diameter E, wherein said that annular end surface has an inside diameter I and an outside diameter E.

* * * * *